US006660955B1

(12) United States Patent
Bues

(10) Patent No.: US 6,660,955 B1
(45) Date of Patent: Dec. 9, 2003

(54) ELECTRIC SWITCH HAVING A COMPARTMENTALIZED METAL CASE FOR RECEIVING DISCONNECTORS

(75) Inventor: Michel Bues, Aix les Bains (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/031,458

(22) PCT Filed: Oct. 12, 2000

(86) PCT No.: PCT/FR00/02846

§ 371 (c)(1),
(2), (4) Date: Jan. 22, 2002

(87) PCT Pub. No.: WO01/29945

PCT Pub. Date: Apr. 26, 2001

(30) Foreign Application Priority Data

Oct. 15, 1999 (FR) ............................................ 99 12875

(51) Int. Cl.[7] .............................................. H01H 33/70
(52) U.S. Cl. ............................ 218/79; 218/80; 361/604
(58) Field of Search ....................... 218/67, 43, 68–70, 218/79, 80, 155; 361/168

(56) References Cited

U.S. PATENT DOCUMENTS 4,479,165 A  * 10/1984 Kamata et al. ............. 361/618
5,796,060 A  *  8/1998 Fuchsle et al. ............... 218/79

FOREIGN PATENT DOCUMENTS

WO        WO 00/24100 A        4/2000

* cited by examiner

*Primary Examiner*—Elvin Enad
*Assistant Examiner*—M. Fishman

(57) ABSTRACT

A metal-clad electric switch having gas insulation and a metal case comprises a case whose inside volume is subdivided into at least two compartments separated by a leakproof partition. A first disconnector is disposed in one of the compartments and comprises a first blade co-operating with a first connection terminal. A second disconnector is placed adjacent to the first disconnector in the other compartment and comprises a second blade co-operating with a second connection terminal. The blades are secured to a common rotary shaft passing in leakproof manner through the partition and providing electrical conduction between the blades.

6 Claims, 2 Drawing Sheets

ELECTRIC SWITCH HAVING A COMPARTMENTALIZED METAL CASE FOR RECEIVING DISCONNECTORS

The invention relates to a metal-clad electric switch having a gas-insulated metal case, in particular for a high voltage substation, the switch comprising in particular disconnector devices including first and second disconnectors disposed adjacent to each other in the case in order to perform the function of switching an incoming feeder to two outgoing feeders, or vice versa.

Such a switch can be used to switch a load, particularly in a substation having a single set of busbars (e.g. in an H configuration) or having two sets of busbars, and it can also be used in conventional manner in a configuration of the one-and-a-half breaker type, or indeed in a loop configuration.

BACKGROUND OF THE INVENTION

Patent application GB-A-425107 discloses such a switch having a disk performing the function of two disconnectors in a common volume of the case.

Patent application DE-3 035 870 discloses a switch having a disk performing the function of three disconnectors in a common volume of the case.

Patent application GB-2 193 843 discloses a switch having a disk performing the functions of two disconnectors and of a grounding switch all in a common volume of the case, which case also contains a circuit breaker.

Finally, patent application WO-00/24100 discloses a switch having a plurality of bladed disconnectors in which the blades are placed adjacent to one another in a common volume of gas and are secured to a common rotary shaft.

In each of those known switches, and for each pole of the high voltage substation, the disconnectors and the circuit breaker, if any, are disposed in a common volume of dielectric gas. With such a disposition, an electrical fault in any one of the load disconnectors of the switch gives rise not only to an interruption in the supply of electricity to the pole in question, but also, in a configuration having two sets of busbars for example, to the loss of service of both sets of busbars for this pole, and this loss continues until the switch has been completely disconnected from the sets of busbars.

The presence of an electric arc due to a fault inside the case of such a switch gives rise firstly to damage of the parts situated inside the volume of the case, and secondly to an increase in the pressure of the dielectric gas in the inside volume of the case, which can cause the breakable safety windows that are generally provided in the wall of the case to break, so that the switch loses its dielectric gas. Any internal fault in any of the volumes of the switch, and in particular when the fault leads to gas being exhausted to the outside, requires all of the conductors and the connection terminals present in said volume to be taken out of circuit and kept out of circuit. Thus, in a configuration having two sets of busbars, for example, both sets, or at least a segment of each set, must be taken out of circuit so long as they remain connected to the switch.

The process of disconnecting a pole of a high voltage substation can take several hours, which is very penalizing for the operation of an electricity network.

BRIEF SUMMARY OF THE INVENTION

An object of the invention is to remedy the disadvantages described above and other disadvantages.

To this end the invention provides a metal-clad electric switch having gas insulation and a metal case, in particular for a high voltage substation, the switch comprising at least first and second load disconnectors placed adjacent to each other inside the case, the first disconnector comprising a rotary blade co-operating with a first connection terminal, the second disconnector comprising a rotary blade co-operating with a second connection terminal, said first and second blades being secured to a common rotary shaft providing electrical conduction between said blades, the switch being characterized in that the case has an inside volume which is subdivided into at least two compartments separated in pairs by respective leakproof partitions, in that the first disconnector is placed in a first of said compartments and the second disconnector is placed in a second of said compartments, and in that the rotary shaft common to said blades passes in leakproof manner through the partition separating the first and second compartments.

Thus, in the invention, the two blades of the two adjacent disconnectors are placed in different volumes of dielectric gas such that a fault on one of the disconnectors does not degrade the ability of the other disconnector to withstand high voltage. Naturally, in the event of a fault in one volume of a switch, the switch can be considered as being out of service in that electricity can no longer continue to pass via the common rotary shaft. Nevertheless, it should also be understood that a disconnector serves not only to pass electricity while it is in the closed position, but also to maintain voltage between its contacts when it is in the open position. Thus, with disconnectors being compartmented in accordance with the invention, and with the leakproof partitions being designed to withstand the difference in dielectric gas pressure between a good compartment and a defective compartment, the disconnector located in the good compartment that remains under pressure is kept open and can maintain the voltage between its blade and its connection terminal connected to a busbar or to a line. In a configuration having two sets of busbars, the set of busbars connected to the connection terminal of the good compartment can then be reconnected to high voltage and can thus be used. The high voltage substation can thus continued to operate in a fault mode insofar as a single set of busbars remains available.

In a particular embodiment of a switch of the invention, one of said blades co-operates with a third connection terminal placed in the same compartment as said blade so as to perform a grounding function such that a single control unit suffices to implement the function of two switching disconnectors and also the grounding function.

In another particular embodiment of a switch of the invention, the case includes a third compartment isolated in leakproof manner from the other two compartments and containing a circuit breaker having a moving contact that moves along the axis of the rotary shaft, said circuit breaker being connected in series with the rotary shaft. This disposition of the circuit breaker and of the rotary shaft within the case contributes to obtaining a switch that is of compact structure.

In another particular embodiment of a switch of the invention, the first connection terminal is electrically connected to the case so that the first disconnector can perform a grounding function, and a third disconnector having a rotary blade co-operating with a third connection terminal is placed adjacent to the first disconnector in the same compartment as the first disconnector or in another compartment of the case which is separated from the compartment of the first disconnector by a leakproof partition.

In another particular embodiment of a switch of the invention, each blade comprises a first arm extending radially from the rotary shaft and a second arm extending the first arm substantially perpendicularly thereto.

BRIEF DESCRIPTION OF THE DRAWINGS

An embodiment of a switch of the invention is described in greater detail below and is shown in the figures.

In FIG. 1, in a high voltage substation configuration that typically has two sets of busbars, the switch shown can be used for switching a load from one incoming feeder to two outgoing feeders, or vice versa. The switch can also be used in other substation configurations, for example in configurations of the loop or the one-and-a-half circuit breaker type. It should be understood that a high voltage substation fitted in this way requires one such switch for each pole, i.e. for each electrical phase.

DETAILED DESCRIPTION OF THE INVENTION

Figure 1:
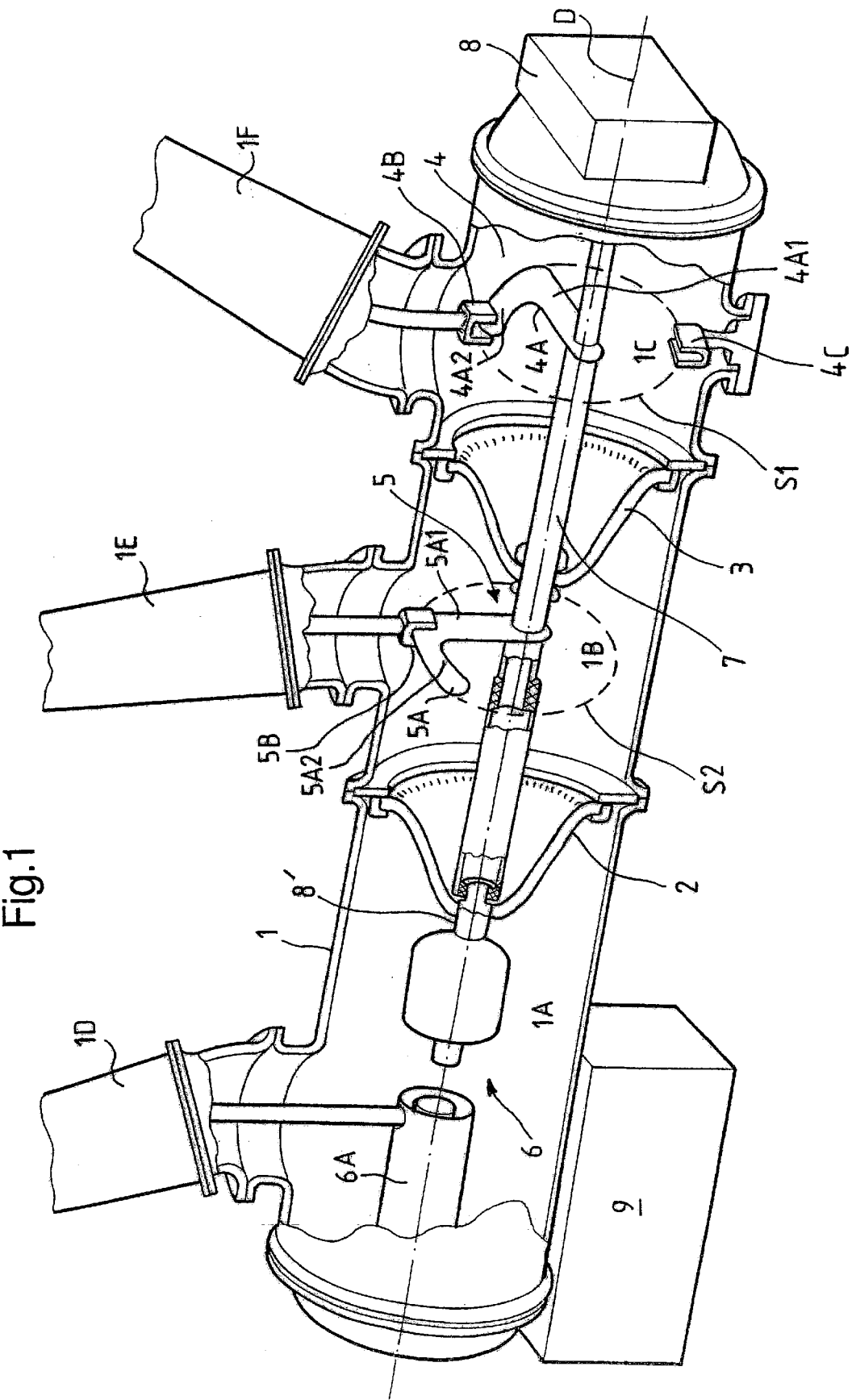
FIG. 1 is a highly diagrammatic view of a switch of the invention comprising two switching disconnectors and one circuit breaker.

The switch comprises a metal case 1 which is implemented in this case as three axially aligned cylindrical segments which are secured end to end in an axial direction D, e.g. by means of bolts.

The inside volume of the case is filled with a dielectric gas such as $SF_6$ at a pressure of a few bars, and in this case it is subdivided into three mutually gas-tight compartments 1A, 1B, and 1C from which respective overhead connection bushings 1D, 1E, and 1F extend.

The compartments 1A to 1C are separated in pairs by leakproof partitions 2 and 3, each constituted in this case by a cone of electrically insulating material held in place by being pinched between the flanges of the joined-together segments.

A first load disconnector 4 is disposed in the compartment 1C and a second load disconnector 5 adjacent to the disconnector 4 is disposed in the compartment 1B. A circuit breaker 6 is disposed in the compartment 1A.

The disconnector 4 comprises a blade 4A secured to a rotary shaft 7 which extends along the direction D and which passes through the wall 3 in leakproof manner. The rotary blade 4A co-operates with a fixed connection terminal 4B disposed inside the compartment 1C on the circular path S1 of the blade 4A.

The disconnector 5 has a blade 5A secured to the rotary shaft 7. The blade 5A co-operates with a fixed connection terminal 5B disposed inside the compartment 1B on the circular path S2 of the blade 5A.

In a configuration having two sets of busbars, for example, the fixed connection terminals 4B and 5B are connected respectively to two bars of the set of busbars of the substation and the blades 4A and 5A are disposed on the rotary shaft so as to make various configurations possible, whereby a load on a conductor of the outgoing bushing iD is applied to a conductor of one or other or both of the outgoing bushings 1E and 1F, these configurations corresponding to different angular positions of the rotary shaft 7. In addition, a fixed third terminal 4C is placed on the circular path of the blade 4A and is used for grounding purposes, such that solely by controlling the shaft 7 it is possible to perform two disconnector functions and the grounding function. Naturally, the terminal 4C is disposed in such a manner as to establish a connection with the blade 4A when it is isolated from the terminal 4B and when the blade 5A is isolated from the terminal 5B.

The rotary shaft 7 is driven by control means 8 mounted at the free end of the segment 1C on the outside of the case 1.

The rotary shaft 7 serves as an electrical conductor between the two disconnectors 4 and 5 and it is extended by a fixed conducting rod 8' that passes in leakproof manner through the wall 2 and that connects the circuit breaker 6 electrically in series with the rotary shaft 7. The circuit breaker 6 has a contact 6A that moves along the axis D of the rotary shaft 7 and that is driven by control means 9 outside the case 1 and placed in the vicinity of the segment 1A.

As can be seen in the Figure, each blade such as 4A and 5A has a respective first arm 4A1, 5A1 which extends radially from the rotary shaft 7, and a respective second arm 4A2, 5A2 which extends the corresponding first arm 4A1, 5A1 substantially perpendicularly thereto along a sector of the circular path S1, S2 of the corresponding blade 4A, 5A.

In the structure of the switch shown in the figure, the two fixed terminals 4B and SB are in alignment in the direction D, and the arms 4A1 and 5A1 of the two blades 4 and 5 respectively are at angular positions that are offset in such a manner as to ensure that partial overlap exists between the sectors defined by the arms 4A2 and 5A2 in projection on a circle centered on the rotary shaft 7. With this structure, different angular positions of the shaft 7 obtain multiple connection combinations for the two blades 4A and 5A with the terminals 4B, 4C, and 5B while using only one control unit 8: both disconnectors open; both disconnectors closed; one disconnector open and the other closed; both disconnectors open together with grounding. It should be understood that it would be equally possible to place the fixed terminals 4B and 5B at different angular positions about the direction D while having the blades 4 and 5 in alignment along the direction D.

For a high voltage substation having a plurality of poles with one switch of the invention per pole, the rotary shafts 7 of the switches can be coupled to move together by gearing or rodding driven by a single control unit.

Figure 2:
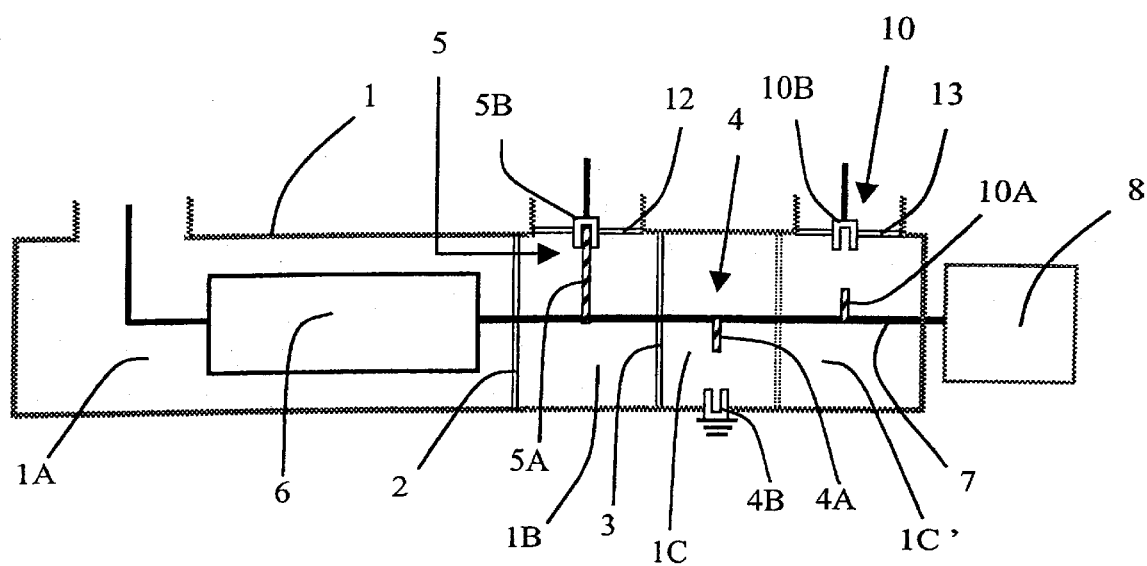
FIG. 2 shows a configuration analogous to that of FIG. 1 but with a ground connection provided by a third blade.

FIG. 2 shows another configuration for a switch of the invention. Like references in FIGS. 1 and 2 designate elements that are identical. In the configuration of FIG. 2, the connection terminal 4B is electrically connected to the case 1 so that the disconnector 4 with the blade 4A performs a grounding function. A third disconnector 10 having a rotary blade 10A mounted on the rotary shaft 7 and co-operating with a third connection terminal 10B is located adjacent to the disconnector 4. The disconnector 10 can be placed in the same compartment as the disconnector 4, or in another compartment 1C' separated from the compartment 1C by a leakproof partition.

The invention is not limited to a hybrid switch having overhead inlet and/or outlet connection bushings such as 1D, 1E, and 1F, and it can be applied to a switch which is connected to at least one set of busbars and/or an outgoing feeder implemented in metal-clad technology. In FIG. 2, references 12 and 13 designate partitions separating the compartments 1C and 1C' respectively from two links going to metal-clad switching lines.

Finally, the switch of the invention need not include a circuit breaker such as 6 within the case 1. Furthermore, the compartment 1A can be extended, possibly by several meters, so as to connect the switch to some particular configuration of metal-clad lines.

What is claimed is:

1. A metal-clad electric switch having gas insulation and a metal case (1), the switch comprising at least first and second load disconnectors (4, 5) placed adjacent to each other inside the case, the first disconnector comprising a rotary blade (4A) co-operating with a first connection terminal (4B), the second disconnector comprising a rotary blade (5A) co-operating with a second connection terminal (5B), said first and second blades being secured to a common rotary shaft (7) providing electrical conduction between said blades, the switch being characterized in that the case has an inside volume which is subdivided into at least two compartments (1A, 1B, 1C) separated in pairs by respective leakproof partitions (2, 3), in that the first disconnector is placed in a first of said compartments and the second disconnector is placed in a second of said compartments, and in that the rotary shaft (7) common to said blades passes in leakproof manner through the partition (3) separating the first and second compartments.

2. The switch of claim 1, in which the rotary blade (4A, 5A) of a disconnector (4, 5) co-operates with a third connection terminal (4C) disposed in the same compartment as said blade so as to provide a grounding function.

3. The switch of claim 1, in which the case has a third compartment (1A) isolated in leakproof manner from the other two compartments and containing a circuit breaker (6) having a moving contact (6A) which moves along the axis of the rotary shaft (7), said circuit breaker being connected in series with said rotary shaft (7).

4. The switch of claim 1, in which the first connection terminal (4B) is electrically connected to the case (1) so that the first disconnector (4) can perform a grounding function, and in which a third disconnector (10) comprising a rotary blade (10A) co-operating with a third connection terminal (10B) is placed adjacent to the first disconnector.

5. The switch of claim 4, in which the third disconnector (10) is placed in a compartment (1C') separate from the compartment (1C) of the first disconnector (4) by a leakproof partition.

6. The switch of claim 1, in which each blade (4A, 5A) comprises a first arm which extends radially from the rotary shaft and a second arm placed to extend the first arm substantially perpendicularly thereto.

\* \* \* \* \*